(12) United States Patent
Adachi et al.

(10) Patent No.: US 7,210,372 B2
(45) Date of Patent: May 1, 2007

(54) LEATHERED STEERING WHEEL

(75) Inventors: Yuichi Adachi, Aichi (JP); Shinsuke Shimiya, Nagareyama (JP)

(73) Assignees: Toyoda Gosei Co., Ltd., Aichi (JP); Nissin Chemical Corporation, Saitama (JP)

( * ) Notice: Subject to any disclaimer, the term of this patent is extended or adjusted under 35 U.S.C. 154(b) by 462 days.

(21) Appl. No.: 10/602,685

(22) Filed: Jun. 25, 2003

(65) Prior Publication Data
US 2004/0035241 A1    Feb. 26, 2004

(30) Foreign Application Priority Data
Jun. 27, 2002   (JP)   ............................ P2002-188209

(51) Int. Cl.
*B62G 1/04*   (2006.01)

(52) U.S. Cl. ......................................................... 74/558

(58) Field of Classification Search .................. 74/558; 112/63, 140, 470.27, 475.24
See application file for complete search history.

(56) References Cited

U.S. PATENT DOCUMENTS

| 3,857,745 | A  | * | 12/1974 | Grausch et al. | ................ 156/83 |
| 4,782,872 | A  | * | 11/1988 | Moschini | ...................... 74/558 |
| 5,251,506 | A  | * | 10/1993 | Itagaki | ........................ 74/558 |
| 6,412,365 | B1 | * | 7/2002  | Nagata et al. | ................ 74/558 |
| 6,414,270 | B1 | * | 7/2002  | Sugiyama et al. | .......... 219/204 |

FOREIGN PATENT DOCUMENTS

JP    A-2000-043736    2/2000

* cited by examiner

*Primary Examiner*—Vicky A. Johnson
(74) *Attorney, Agent, or Firm*—Posz Law Group, PLC

(57) ABSTRACT

In a leathered steering wheel, a leather layer is so arranged as to cover a covered layer of a ring part, and the leather layer is formed by stitching, along the circumferential direction of the ring part, a plurality of leather materials to one another, and the end portions of the leather material are structured with thin portions formed by thinning the back sides of the end portions such that thickness around stitching portions is lowered, wherein a length $L_1$ from the stitching portion to the end face of each leather material is set to be substantially equal to or slightly smaller than a thickness $t_1$ of a main portion of the leather material, and the end face is brought into abutment to the covered layer.

5 Claims, 7 Drawing Sheets

LEATHERED STEERING WHEEL

The present application is based on Japanese Patent Application No. 2002-188209, the entire contents of which are incorporated herein by reference.

BACKGROUND OF THE INVENTION

1. Field of the Invention

The present invention relates to a leathered steering wheel for steering a vehicle, and in particular, to a leathered steering wheel in which the outer circumference is covered with a leather layer in a ring part.

2. Related Art

Conventionally, as shown in Japanese Patent Publication No. 2000-43736A, there is a leathered steering wheel of a structure of an outer circumference of the ring part covered with the leather layer allover. In this kind of steering wheels, a core of the ring part is arranged on the circumference of the wheel. And the core is covered with a covered layer of a soft synthetic resin, and the leather layer is placed to cover the outer circumference of the covered layer.

In the leathered steering wheel of such a structure, the leather layer is formed by combining a plurality of divided end portions of the leather materials each other in a manner that the outer circumferential face of the ring part is covered neatly. When the leather layer has such a structure, in view of appearance of the steering wheel, tactile feel at use, or abrasion resistance, the leather materials should be joined without forming unevenness at the joint portion.

Therefore, as the leather layer 1, one of the related art shows thin portions 2d by thinning obliquely back sides of the leather materials 2, 2 as seen in FIG. 1A, in a manner that end portions 2b to be connecting sides become thinner respectively in thickness as going to end sides 2c in main portions 2a, 2a of neighboring leather materials 2, 2, and the related art stitches the leather materials 2, 2 each other at almost centers of the thin parts 2d as seen in FIG. 1B. In the leather layer 1, as seen in FIG. 1C, adhesive layers 4 are coated on the back sides of the thin portions 2d, and portions 2e at the front end of stitched portion 3 are turned down respectively and adhered to the respective leather materials 2, such that the end sides 2c are returned to initial sides. At this time, the thin portions 2d at the end portions 2b of the leather material 2 are set so that, when turning down the ends 2c, the turned portions 2e do not protrude the surface of the leather materials 2.

However, even if the leather layer 1 is composed as mentioned above, the thickness around the stitching portion 3 is larger than that of the main portion 2a of the leather material 2, and if the leather layer 1 is placed on the outer circumference of the covered layer 5, as shown in FIG. 1D, the part about the stitching portion 3 largely and inevitably protrude. Therefore, using for a long time, the parts about the stitching portion 3 are worn.

Further, in other related art, as shown in FIG. 2, a predetermined position of the covered layer 8 is defined with a groove portion 8a, into which the leather materials 7 coated with the adhesive agent are fitted at ends 7a to combine the ends 7a each other, thereby arranging the leather layer 6 so as to cover the outer circumference of the covered layer 8.

However, in case the leather layer 6 is so structured, the groove portion 8a is necessarily defined in the covered layer 8 for fitting the ends 7a of the leather materials 7, and therefore, when changing the positions of combining the leather materials 7 in the ring part, designing alterations as a metal mold are accordingly necessary for forming the covered layer 8, and countermeasures therefore are not easy.

SUMMARY OF THE INVENTION

The invention is to solve the above mentioned problems, and accordingly it is an object of the invention to provide a steering wheel enabling to increase abrasion resistance by suppressing the protrusions at the parts of combining the mutual leather materials in the leather layer, and to easily take the countermeasures against alterations in stitching positions of the leather materials.

In regard to a leathered wheel of the invention, a leather layer is so arranged as to cover an outer circumference thereof in a covered layer of a ring part of the same, and the leather layer is formed by stitching, along the circumference of the ring part, a plurality of divided end portions of leather materials each other, and the leathered wheel of the invention is characterized in that the respective end portions of the leather material are structured with thin portions formed by thinning the back sides of said end portions, such that thickness around stitching portions is reduced, while the length from the part to be stitched to the end of the leather material is set such that said length is substantially equal to a thickness of a main portion of said leather material, and an end face of said end is contacted to the covered layer.

As to the above structured leathered steering wheel, the end of the leather materials contact the covered layers at end faces, and the length from the stitching portion to the end of the leather material is set to be substantially equal to the thickness of the main portion of the leather material. That is, in the leathered steering wheel of the invention, since the end of the leather material is not turned down as the related art shown in FIG. 1, the thickness of the leather layer can be made almost uniform including parts around the stitching portion without making the thickness large around the stitched part. Further, the leathered steering wheel of the invention has the structure arranged with the thin portion of the leather material around the end thereof. Therefore, when the leather layer is placed at the outer circumference of the covered layer, the end of the leather material enters into a recess defined in the thin portion thereof. As a result, in the leather layer, the protrusion of the stitching portion can be more suppressed.

Further, in the leathered steering wheel of the invention, since it is any longer unnecessary to turn down and adhere the end of the leather materials as the related art shown in FIG. 1, the production processing number and cost therefor may be lowered. In addition, in the leathered steering wheel of the invention since the covered layer does not need the groove portion as the related art shown in FIG. 2, when altering stitching portions of the leather materials, any designing alterations in the covered layer are not requisite, and it is easy to take the countermeasures against alterations in stitching positions of the leather materials.

Accordingly the leathered steering wheel of the invention enables to increase abrasion resistance by suppressing the protrusion at the part of combining the leather materials in the leather layer, and to easily take the countermeasures against alterations in stitching positions of the leather materials.

The leathered steering wheel is preferably structured to be set such that the thin portion of each of the leather materials makes the thickness including the end face larger than the thickness of the stitching portion.

With such a structure of the leathered steering wheel, since the thickness of the end of the leather material is larger than the thickness of the stitching portion, the end of the leather material is difficult to slip out from a stitching thread at the stitching portion, so that the leather layer can increase tensile strength. In the above structured leathered steering wheel, the position more recessed than the end of the leather material is stitched, and since stitching portions can be easily seen, stitching works are desirable.

DETAILED DESCRIPTION OF THE PREFERRED EMBODIMENTS

The invention will be explained on the basis of one embodiment as follows.

Figure 3:
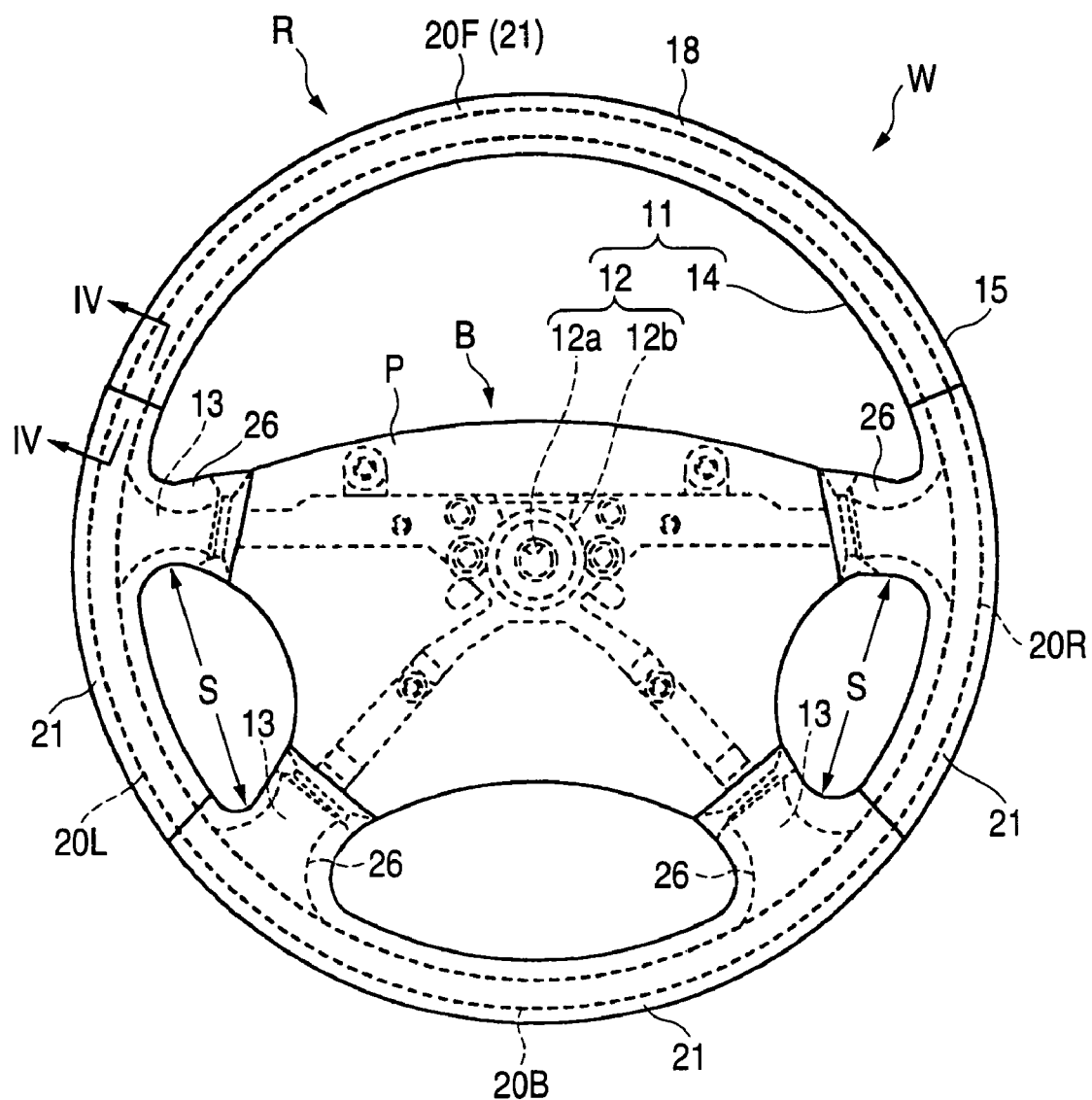
FIG. 3 is a plan view of the leathered steering wheel as one embodiment of the invention.

The leathered steering wheel W of the embodiment comprises, as shown in FIG. 3, a ring part R to be held while steering, a boss part B at the center of the ring part, and four spoke parts S connecting the ring part R and the boss part B, and at these respective parts, a steering wheel core 11 is disposed for connecting the members one another. That is, the steering wheel core 11 is, as seen in FIG. 3, composed of a boss part core 12 disposed at the boss part B, spoke part cores 13 at the respective spoke parts S, and a ring part core 14 at the ring part R.

As to the steering wheel core 11, a central boss 12a of the boss part core 12 connected to a steering shaft is steel-made, while a boss protecting part 12b around a boss 12a of the other boss part core 12, spoke part cores 13, and the ring part core 14 are formed via a die cast using light alloys as Mg alloy or Al alloy.

Figure 4:
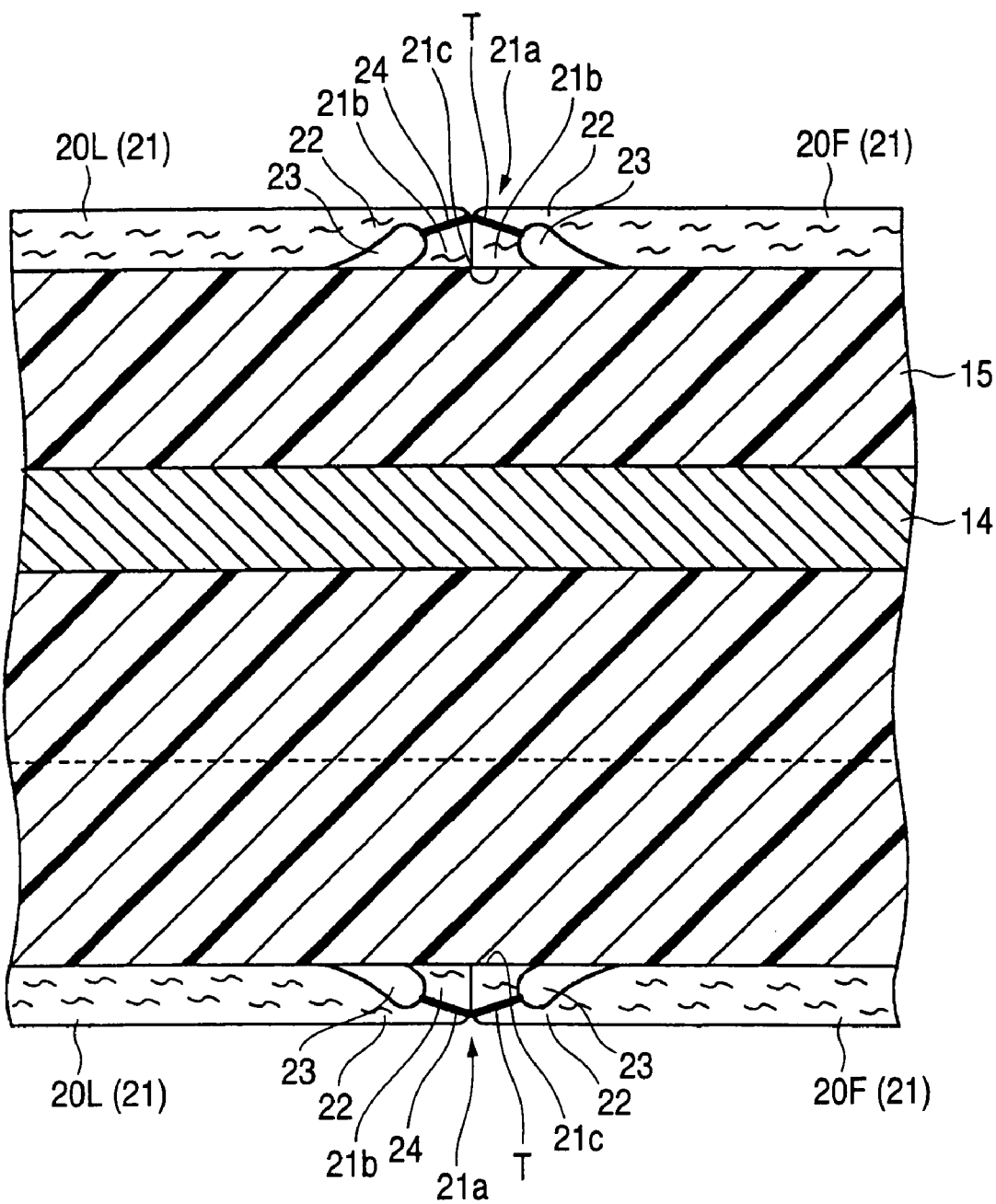
FIG. 4 is a cross sectional view taken along IV—IV of FIG. 3.

Around the ring part R and the cores 14, 13 in relation with the spoke parts S near the ring part R, as seen in FIGS. 3 and 4, the covered layer 15 is covered which is made of a soft synthetic resin as polyurethane.

The leather layer 18 is disposed with an adhesive agent (not shown) intervening so as to protect the ring part R and the outer circumference of the covered layer 15 in the spoke parts S near the ring part R. In this embodiment, the leather layer 18 covers allover the outer circumference of the ring part R. The leather layer 18 is structured by stitching (T) ends 21 of the leather materials 20 comprising a plurality of divided end portions of a natural leather at a thereof along the circumference of the ring R (see FIG. 4).

Figure 5A:
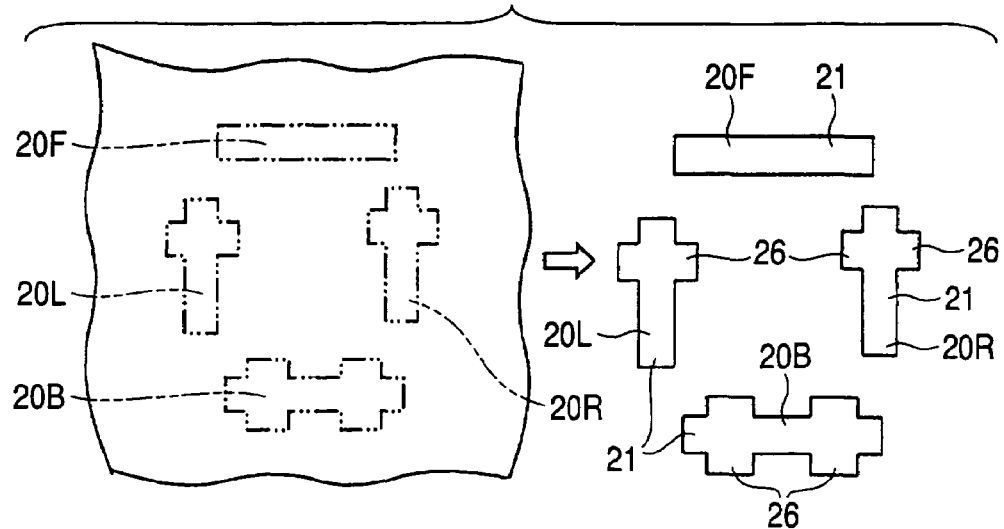
FIGS. 5A through 5D are schematic views showing the producing steps of the leather layer in the same embodiment.

In the embodiment, the leather layer 18 has the structure comprising four leather materials 20 of a leather material 20F, a leather material 20B, and leather materials 20L, 20R, said leather material 20F being disposed at the front side in the ring part R and between the spokes S, S, said leather material 20B being disposed at the rear side in the ring part R including the two spokes S, S, and said leather materials 20L, 20R being disposed at the left and right sides in the ring part R, each of which includes one spoke S (see FIGS. 3 and 5A). The respective leather materials 20F, 20B, 20L, 20R have rectangular main portions 21. The leather material 20B symmetrically projects four extending parts 26 from both sides of the main portion 21, while the leather layers 20L, 20R symmetrically project two extending parts 26 from both sides of the main portion 21 (see FIG. 5A). In the leather materials 20F, 20B, 20L, 20R, the respective main portions 21 have the structure covering the outer circumference of the covered layer 15 in the ring part R, and the extending parts 26 have the structure covering the outer circumference of the covered layer 15 in the respective spokes S. The leather layer 18 is structured by stitching (T) the end portions 21a each other in the length direction in the main portions 21 of the leather materials 20F, 20B, 20L, 20R.

At the end portions 21a of the main portions 21 of the respective leather materials 20, the thin portions 22 are formed by thinning the back sides so as to make the thickness of the stitching portions 24 thin. The thin portion 22 is disposed in the transverse direction of the main portion 21, and in the embodiment, the thin portion 22 is formed allover the circumference in cross section in the circumferential direction of the ring part R together with the stitching portion 24. The respective leather materials 20 are, as shown in FIGS. 5A through 5D, set such that the length L1 between the stitching portion 24 and the end face 21c of the leather material is substantially equal to or slightly smaller than the thickness t1 of the main portion 21, the end face 21c of the end portion 21b of the leather material is contacted to the covered layer 15. That is, in the embodiment, the end portion 21b of the leather material 20 is, as shown in FIG. 4, arranged so that the end face 21c is contacted to the covered layer 15, and the leather layer 18 makes the thickness (thickness t1 of the main portion 21 in the leather material 20) almost uniform including parts around the stitching portion 24. Then, the ends 21b of the leather materials 20 enter into a recess 23 defined in the thin portion 22 thereof (see FIG. 4). The embodiment sets that the thickness t1 of the main portion 21 is 1.0 to 1.7 mm (preferably 1.1 to 1.5 mm), and the length L1 between the stitching portion 24 and the end face 21c of the leather material is 1.0 to 1.5 mm (preferably 1.0 to 1.2 mm).

In the embodiment, as to the main portion 21 of the leather material 20, the thin portion 22 is set such that the thickness including the end face 12c is larger than the thickness of the stitching portion 24, while the stitching portion 24 is disposed in the most recessed portion in the recess part 23 forming the thin portion. That is, the embodiment determines such that the thickness t3 of the end portion 21b of the main portion 21 of the leather material 20 satisfies a condition of t2<t3≦t1 with respect to the thickness t1 of the main portion 21 and the thickness t2 around the stitching portion 24 (see FIGS. 5B and 5C). The embodiment determines the thickness t2 of the most recessed portion (around the stitching portion 24) in the thin portion 22 to be 0.6 to 1.5 mm (preferably 0.7 to 1.1 mm). If the thickness t2 is less than 0.6 mm, tensile strength cannot be sufficiently secured at the stitching portion 24, while being more than 1.5 mm, the thickness around the stitching portion 24 in the leather layer 18 is probably larger than the thickness (thickness t1 of the main portion) of the other part in the leather layer 18.

Further, in the embodiment, the thin portion 22 is formed by thinning the cross sectional shape substantially in arc along the shortness direction of the main portion 21. The recess 23 forming the thin portion 22 is set to be 1.5 to 4.5 mm (preferably 2.0 to 4.0 mm) in the width.

In the embodiment, the thickness t1 of the leather material 20 is set to be 1.3 mm, the thickness t3 around the end portion 21a of the main portion 21 is set to be 1.3 mm, and the thickness t2 around the stitching portion 24 in the thin portion 22 is set to be 0.7 mm.

Next, explanation will be made to the producing method of the leather steering wheel W of the embodiment. At first, a core 11 of the steering wheel has been in advance produced by setting a boss 12a in a predetermined die casting mold.

Figure 5B:
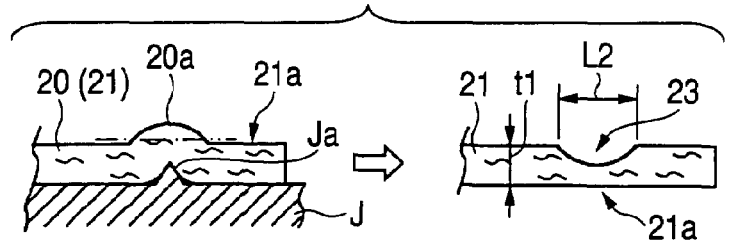
Figure 5C:
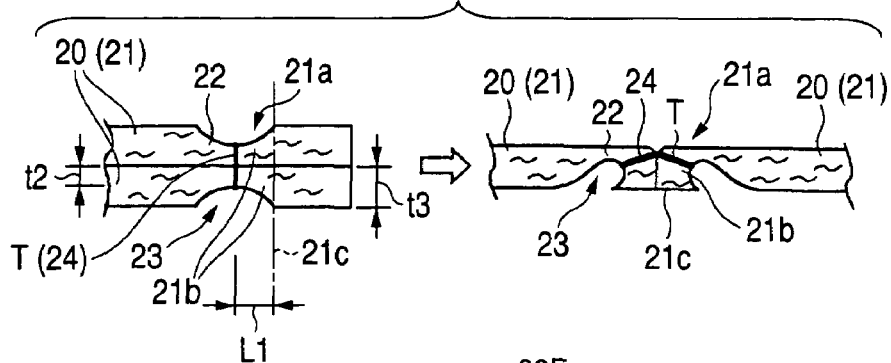
Figure 5D:
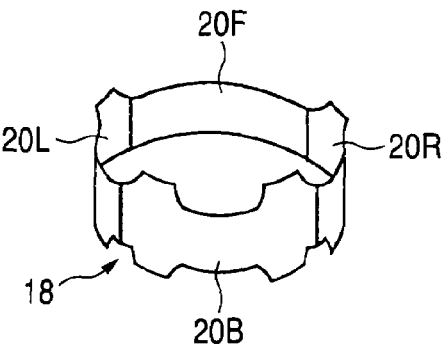

The leather layer 18 has been previously formed. As shown in FIG. 5A, a sheet material is cut into the leather materials 20 of predetermined shapes (20F, 20B, 20L, 20R), and the thin portions 22 are formed in the end portions 21a in the longitudinal direction of the main portion 21. The thin portion 22 is, as shown in FIG. 5B, formed by use of a jig J having a projection Ja at a predetermined portion. At first, the leather material 20 is closely mounted on the surface of the jig J, so that the surface of the leather material 20 is placed to the side of the jig J. A portion 20a upheaved by the projection Ja in the leather material 20 is thinned by grinding to form the thin portion 22. Subsequently, the main portions 21 of the neighboring leather materials 20 are piled each other to be opposite at the upper surface sides as shown in FIG. 5C, and the most recessed portions of the recess parts 23 formed in the thin part 22 is stitched with the thread T. Then, the stitched two sheets of the main portions 21, 21 are cut away at predetermined parts (parts becoming the end faces 21c). Of course, the end portions may be cut before stitching, and stitched after cutting, otherwise the stitching work and the cutting work may be carried out at the same time. As mentioned above, the respective leather materials 20F, 20B, 20L, 20R are combined to form the ring shaped leather layer 18 as seen in FIG. 5D.

The forming mold of the covered layer 15 is set with the steering wheel core 11, and the covered layer 15 is formed on the ring part R and the positions of the spoke parts S near the ring part R. The covered layer 15 is coated with the adhesive agent on the outer circumference, and the leather layer 18 is covered on the outer circumference of the covered layer 15 via the adhesive layer. The stitching thread T combines the mutual ends of the leather material 20 placed at the inner circumference of the ring part R in the transverse direction of the main portion 21, and the mutual edges of the extending part 26 placed at the outer circumference of the spoke part S, and the leathering work of the leather layer 18 may be accomplished.

Attaching a lower cover (not shown) or a pad P to the boss part B at its upper or lower parts, the production of the leathered steering wheel W is accomplished, and may be attached to the vehicle. When attaching to the vehicle, the steering wheel W is secured by nut to the steering shaft, and therefore it is attached while releasing the pad P, and after attaching, the pad P is set up.

As to the above structured leathered steering wheel W, the end portion 21b of the leather material 20 contacts the covered layer 15 at its end face 21c of the leather material 20, and the length L1 from the stitching portion 24 to the end face 21c of the leather material 20 is set to be substantially equal to the thickness t1 of the main portion 21 of the leather material 20. That is, in the leathered steering wheel W of the embodiment, since the end of the leather material is not turned down as the related art shown in FIGS. 1A through 1D, the thickness of the leather layer can be made almost uniform including parts around the stitching portion 24 without making the thickness large around the stitching portion 24. Further, the leathered steering wheel W of the embodiment has the structure arranged with the thin portion 22 of the leather material 20 around the end portion 21b thereof. Therefore, when the leather layer 18 is placed at the outer circumference of the covered layer 15, the end portion 21b of the leather material enters into a recess 23 defined in the thin portion 22 thereof as shown in FIG. 4. As a result, in the leather layer 18, the protrusion of the stitching portion 24 can be more suppressed.

Figure 1A:
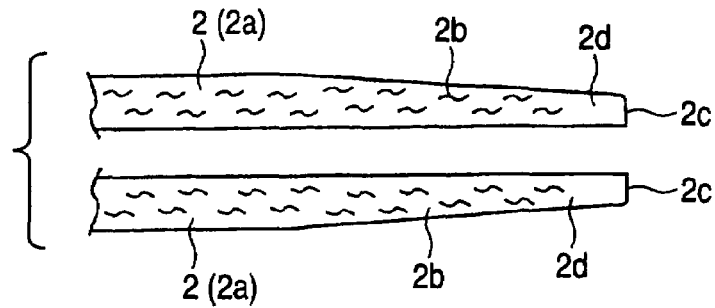
FIGS. 1A through 1D are schematic views showing the combining method of the leather materials of the leather layer of the conventional leathered steering wheel.
Figure 1B:
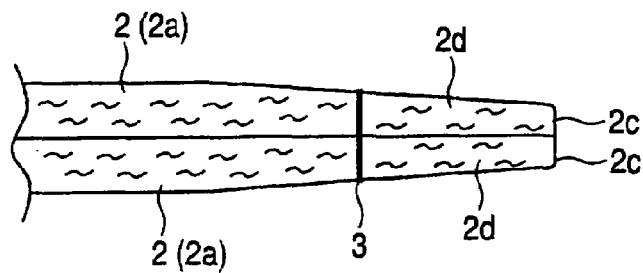
Figure 1C:
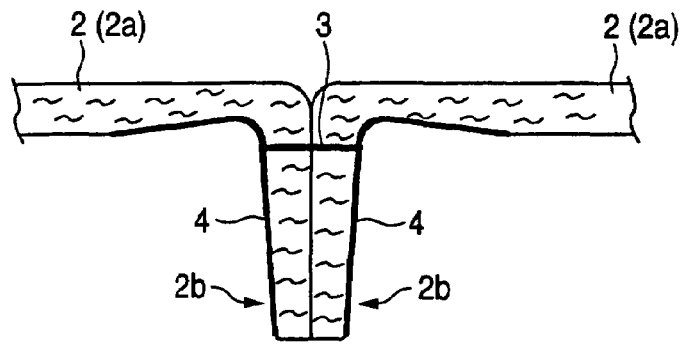
Figure 1D:
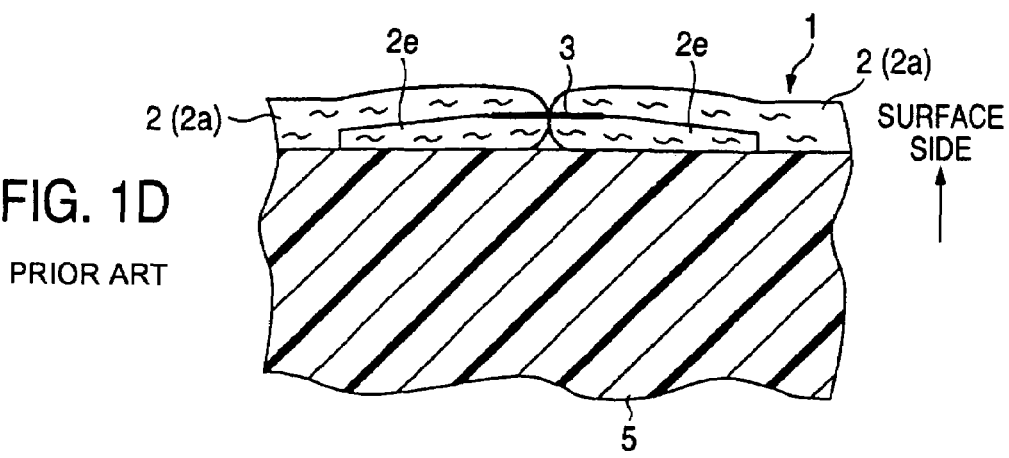
Figure 2:
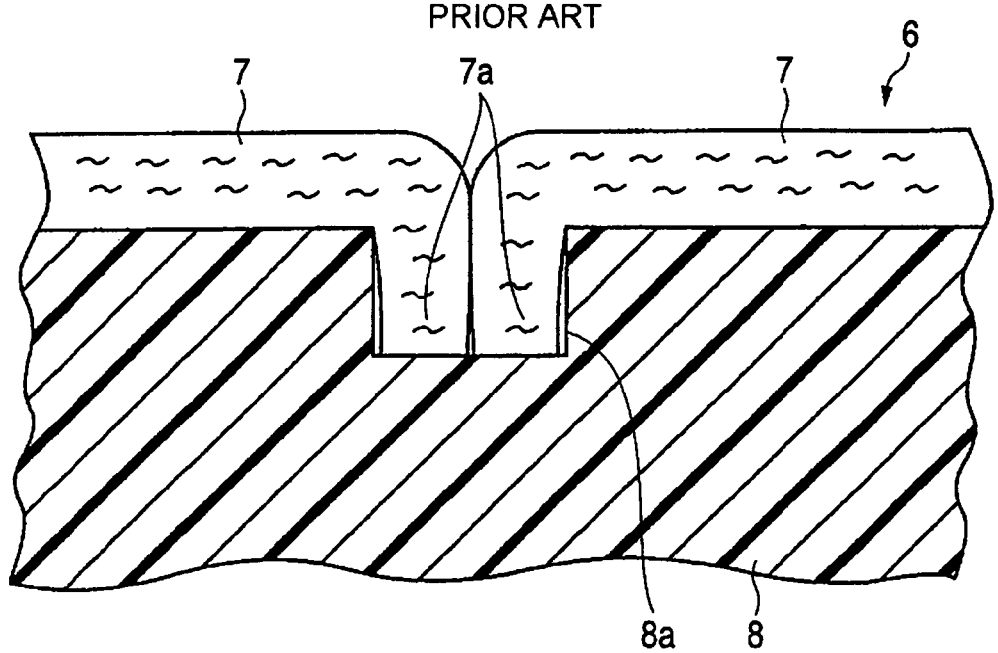
FIG. 2 is a cross sectional view showing a part around the combined part of the leather materials of the leather layer of the conventional leathered steering wheel.

Further, in the leathered steering wheel W of the embodiment, since it is any longer unnecessary to turn down and adhere the end 2b of the leather material 2 as the related art shown in FIGS. 1A through 1D, the production processing number and cost therefor may be lowered. In addition, in the leathered steering wheel W of the embodiment, since the covered layer does not need the groove portion as the related art shown in FIG. 2, when altering the part to be stitched of the leather material 20, any designing alterations in the covered layer 15 are not requisite, and it is easy to take the countermeasures against alterations in stitching positions of the leather materials 20.

Accordingly the leathered steering wheel W of the embodiment enables to increase abrasion resistance by suppressing the protrusion at the part 24 (stitching portions) of combining the leather materials 20 in the leather layer 18, and to easily take the countermeasures against alterations in stitching positions of the leather materials 20.

In the leathered steering wheel W of the embodiment, the thin portion 22 formed in the main portion 21 of each of the leather materials 20 is set to make the thickness t3 including the end face 21b larger than the thickness t2 of the stitching portion 24. With such a structure of the leathered steering wheel W, since the thickness t3 of the end portion 21b of the main portion 21 is larger than the thickness t2 of the stitching portion 24, the end portion 21b of the main portion 21 of the leather material 20 is difficult to slip out from the stitching thread T at the stitching portion 24, so that the leather layer can increase the tensile strength. In the above structured leathered steering wheel W, the position 23 more recessed than the end 21c of the leather material 20 is stitched, and since stitching portions can be easily seen, the stitching works are desirable.

Figure 6A:
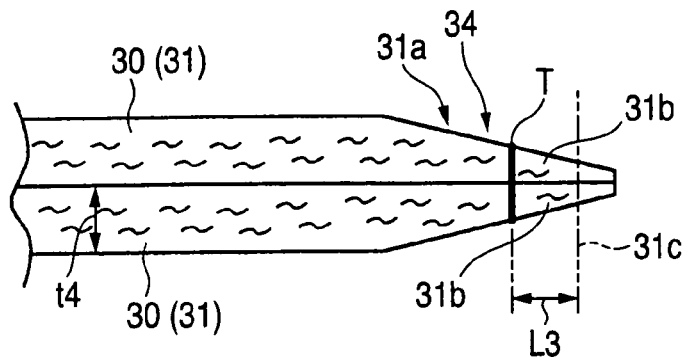
FIGS. 6A through 6C are schematic views showing the combining method of the leather materials of the leather layer of the steering wheel of another embodiment.
Figure 6B:
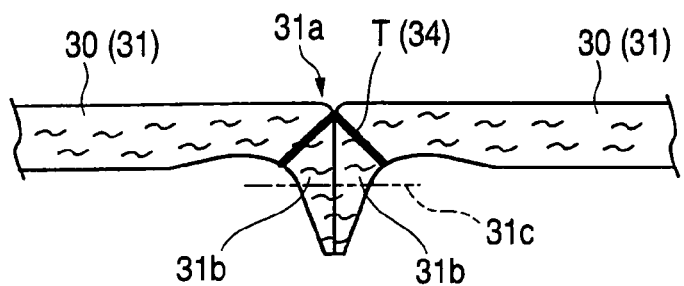
Figure 6C:
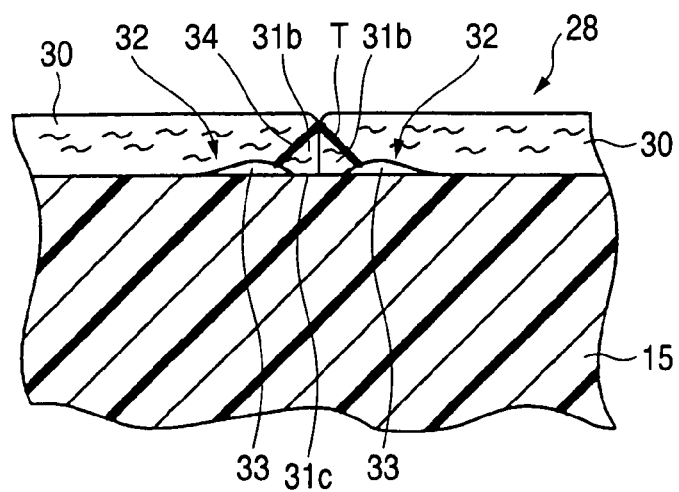

Ignoring these regards, as the leather layer 28, the structure of stitching the leather materials 30 may be employed as shown in FIGS. 6A through 6C. As to the leather materials 30, the thin portion 32 at the end portion 31a of the main portion 31 is formed by thinning obliquely the back side of the end portion 31a in the main portion 31 toward the end side 31b so as to reduce the thickness similarly to the related art shown in FIGS. 1A to 1D. As seeing the above mentioned leather layer 18, the end portions 31a are stitched each other, such that a size L3 between the stitching portion 34 and the end 31b of the leather material is almost equal to the thickness t4 of the main portion 31, and the leather layer 28 is formed. Also in this leather layer 28, the leather material 30 contacts the covered layer 15 at the end face 31c of the end 31b thereof, so that the ends 31b are slightly fitted in the recesses 33 formed in the thin portion 32 (see FIG. 6C). That is, the leather layer 28 is set such that the thin portion 32 of the leather material 30 makes the thickness including the side of the end face smaller than the thickness of the stitching portion 34, and the leather material 30 makes the thickness of the end face 31c smaller than the thickness of the stitching portion 34.

The above structured leather layer 28 is at first formed with the thin portion 32 in the end portion 31a in the main portion 31 of the leather material 30 similarly to the above mentioned leather layer 18. The thin portion 32 is formed by thinning the back side of the end portion 31a of the main portion 31 as becoming thinner toward the front end. Subsequently, the main portions 31 of the leather materials 30 are piled each other at the outer circumferences as shown in FIG. 6A, and stitched with the thread T at middle parts of the thin portions 32. Then, as seen in FIG. 6B, the stitched two sheets of the main portions 31 are cut away at predetermined parts (parts becoming the end faces 31c). Of course, the end portions may be cut before stitching, and stitched after cutting, otherwise the stitching work and the cutting work may be carried out at the same time.

Figure 7A:
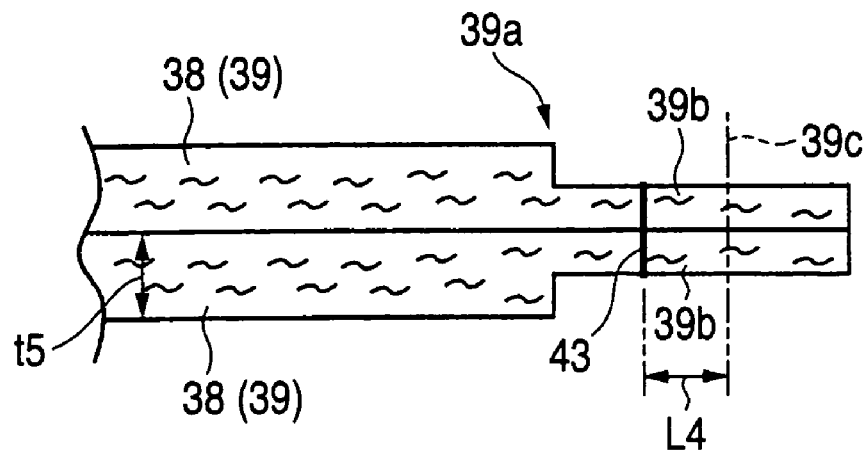
FIGS. 7A and 7B are schematic views showing the combining method of the leather materials of the leather layer of the steering wheel of a further embodiment.
Figure 7B:
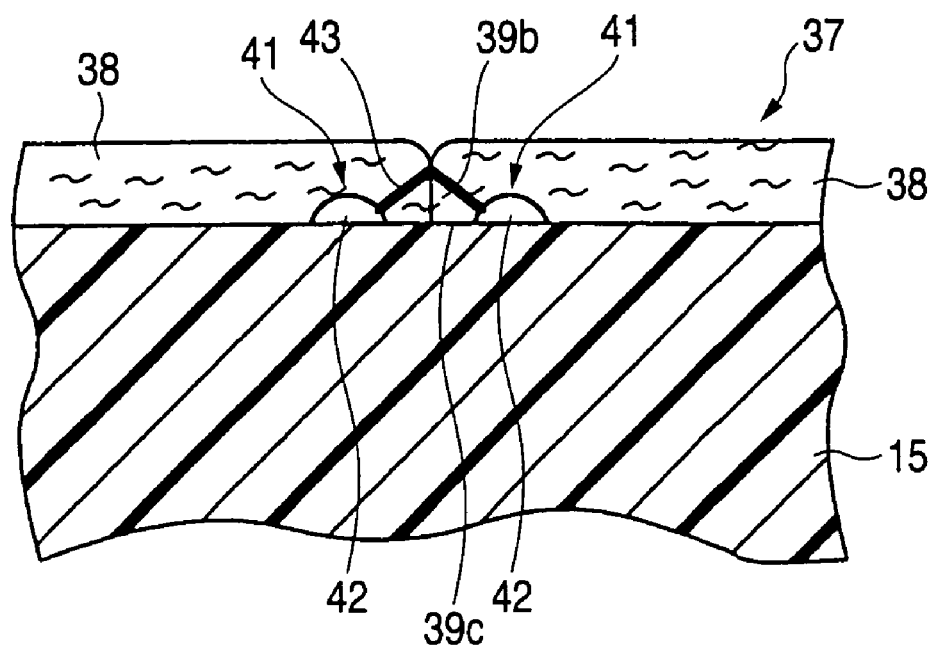

As the leather layer 37, the structure of stitching the leather materials 38 of the thickness of the end face 39c being almost equal to the thickness of the stitching portion 43 may be employed as shown in FIGS. 7A and 7B. As to the leather materials 38, the thin portion 41 at the end portion 39a of the main portion 39 is formed by thinning the end portion 39a so as to reduce the thickness uniformly as shown in FIG. 7A. As seeing the above mentioned leather layers 18, 28, the end portions 31a are stitched each other, such that a size L4 between the stitching portion 43 and the end 39b of the leather material is almost equal to the thickness t5 of the main portion 39 of the leather material 38, and the leather layer 37 is formed. Also in this leather layer 37, the leather material 38 contacts the covered layer 15 at the end face 39c of the end 39b thereof, so that the ends 39b are slightly fitted in the recesses 42 formed in the thin portion 41 (see FIG. 7B). This leather layer 37 may be formed similarly to the above mentioned leather layer 28.

The embodiment has been explained with the example of the leathered steering wheel W of the structure covered with the leather layer 18 allover the outer circumference of the ring part R, and as far as the steering wheel has the leather layer composed by combining a plurality of leather materials, no limitation is made to the above mentioned embodiments, for example, the invention may be partially applied to the steering wheel having the structure arranged with the leather layers formed by stitching the leather material each other.

Further, the embodied steering wheel W is furnished with the spoke parts at the four positions, but shapes of the steering wheel capable of being applied with the invention are not limited thereto, and the invention may be employed to such a steering wheel disposed with the spoke parts S at two or three parts. The core metal 11 of the steering wheel is not limited to the light alloy but may be steel-made. The steering wheel W of the embodiment has the covered layer 15 composed of the soft synthetic resin, but for example, it may have a double layered structure of the hard resin layer in the inner circumference and the soft resin layer in the outer circumference.

What is claimed is:

1. A leathered steering wheel comprising:
   a ring portion having a covered layer on which a leather layer is arranged;
   the leather layer provided with a plurality of leather materials, each leather material having a main portion and end portions defined on both ends of each leather material in a longitudinal direction thereof, wherein the leather materials are joined to one another along a circumferential direction of said ring portion by stitching at said end portions of the leather materials,
   a thin portion being formed at each end portion of the leather materials by thinning a back side of said end portion such that a thickness of the thin portion at a stitching portion of said end portion, which is to be stitched to an end portion of the adjacent leather material, is reduced relative to the main portion, wherein
   a stitching thread is located within the thin portion, and the stitching thread is exposed on a back side of the leather material at the stitching portion, and
   a length L1 from the stitching portion to an end face of said leather material is set to be substantially equal to or slightly smaller than a thickness t1 of said leather material at a main portion thereof, so that said end face of said end portion is brought into abutment with said covered layer of said ring portion.

2. The leathered steering wheel according to claim 1, wherein said thin portion of said leather material is set such that a thickness t3 at said end face of said leather material is substantially made larger than a thickness t2 at said stitching portion.

3. The leathered steering wheel according to claim 2, wherein the length L1 is in a range from 1.0 mm to 1.5 mm, and the thickness t2 is in a range from 0.6 mm to 1.5 mm.

4. The leathered steering wheel according to claim 1, wherein the length L1 is in a range from 1.0 mm to 1.5 mm.

5. The leathered steering wheel according to claim 1, wherein a recess is formed in the back side of the leather material, and the exposed stitching on the back side of the leather material is located in the recess.

* * * * *